United States Patent
Basturk (10) Patent No.: US 7,111,074 B2
(45) Date of Patent: Sep. 19, 2006

(54) CONTROL METHOD FOR DATA PATH LOAD-BALANCING ON A DATA PACKET NETWORK

(75) Inventor: Erol Basturk, Cupertino, CA (US)

(73) Assignee: Pluris, Inc., Cupertino, CA (US)

( * ) Notice: Subject to any disclaimer, the term of this patent is extended or adjusted under 35 U.S.C. 154(b) by 735 days.

(21) Appl. No.: 09/912,849

(22) Filed: Jul. 24, 2001

(65) Prior Publication Data

US 2003/0023750 A1    Jan. 30, 2003

(51) Int. Cl.
- G06F 15/173 (2006.01)
- G06F 15/16 (2006.01)
- H04L 12/28 (2006.01)
- H04L 12/56 (2006.01)

(52) U.S. Cl. .................. 709/241; 709/226; 709/229; 709/244; 370/395.21; 370/395.41

(58) Field of Classification Search ............... 709/226, 709/229, 241, 244, 224, 233; 370/395.21, 370/395.41
See application file for complete search history.

(56) References Cited

U.S. PATENT DOCUMENTS

| | | | | |
|---|---|---|---|---|
| 5,519,836 A * | 5/1996 | Gawlick et al. | ............ | 709/241 |
| 6,023,733 A * | 2/2000 | Periasamy et al. | .......... | 709/241 |
| 6,195,553 B1 * | 2/2001 | Claffery et al. | ............. | 455/445 |
| 6,314,093 B1 * | 11/2001 | Mann et al. | ................. | 370/351 |
| 6,314,465 B1 * | 11/2001 | Paul et al. | ................... | 709/226 |
| 6,363,319 B1 * | 3/2002 | Hsu | ........................... | 701/202 |
| 6,370,119 B1 * | 4/2002 | Basso et al. | ................ | 370/252 |
| 6,370,560 B1 * | 4/2002 | Robertazzi et al. | ......... | 718/105 |
| 6,542,468 B1 * | 4/2003 | Hatakeyama | ............... | 370/238 |
| 6,577,600 B1 * | 6/2003 | Bare | .......................... | 370/238 |
| 6,600,724 B1 * | 7/2003 | Cheng | ........................ | 370/256 |
| 6,611,874 B1 * | 8/2003 | Denecheau et al. | ......... | 709/239 |
| 6,633,544 B1 * | 10/2003 | Rexford et al. | ............. | 370/238 |
| 6,643,699 B1 * | 11/2003 | Liver | ......................... | 709/226 |
| 6,658,479 B1 * | 12/2003 | Zaumen et al. | ............. | 709/238 |
| 6,683,945 B1 * | 1/2004 | Enzmann et al. | ...... | 379/221.01 |
| 6,741,552 B1 * | 5/2004 | McCrosky et al. | ......... | 370/218 |
| 6,760,775 B1 * | 7/2004 | Anerousis et al. | .......... | 709/238 |

(Continued)

OTHER PUBLICATIONS

Pearlman, Marc et al. "On the Impact of Alternate Path Routing for Load Balancing in Mobile Ad Hoc Networks," Intl. Symposium on Mobile Ad Hoc Networking and Computing, Session A, 2000, pp. 3-10.*

(Continued)

*Primary Examiner*—Jason Cardone
*Assistant Examiner*—Melvin H. Pollack
(74) *Attorney, Agent, or Firm*—Donald R. Boys; Central Coast Patent Agency, Inc.

(57) ABSTRACT

A control system is disclosed for controlling data flow over a data-packet-network according to specific destinations. The system has a network monitoring system for monitoring network performance parameters; a network access system for accessing specific nodes in the network; and a control software executable on the network access system for assigning and changing cost parameters at selected nodes in the network. A network administrator uses the network access system and control software to assign and implement cost values at the selected nodes, the values associated individually with a specific destination or destinations, the values establishing forwarding costs to be incurred at the selected nodes, and link costs to be incurred per data link between the nodes such that manipulation of such cost value assignments enables load balancing of data traveling through the network. In one embodiment the data-packet-network is internal to a router and nodes comprise internal router cards.

28 Claims, 3 Drawing Sheets

U.S. PATENT DOCUMENTS

| | | | |
|---|---|---|---|
| 6,778,496 B1* | 8/2004 | Meempat et al. | 370/230 |
| 6,789,125 B1* | 9/2004 | Aviani et al. | 709/238 |
| 6,831,891 B1* | 12/2004 | Mansharamani et al. | 370/229 |
| 6,865,160 B1* | 3/2005 | Bare | 370/256 |
| 6,947,963 B1* | 9/2005 | Agarwal et al. | 709/201 |
| 6,981,055 B1* | 12/2005 | Ahuja et al. | 709/238 |
| 2002/0103846 A1* | 8/2002 | Zisapel et al. | 709/105 |
| 2002/0178259 A1* | 11/2002 | Doyle et al. | 709/225 |
| 2002/0198995 A1* | 12/2002 | Liu et al. | 709/226 |
| 2002/0199012 A1* | 12/2002 | Cable et al. | 709/233 |

OTHER PUBLICATIONS

Volz, B., et al. "DHC Load Balancing Algorithm," RFC 3074, Feb. 2001, pp. 1-10.*

Brisco, T. "DNS Support for Load Balancing," RFC 1794, Apr. 1995, pp. 1-7.*

Hopps, C. "Analysis of an Equal-Cost Multi-Path Algorithm," RFC 2992, Nov. 2000, pp. 1-8.*

* cited by examiner

CONTROL METHOD FOR DATA PATH LOAD-BALANCING ON A DATA PACKET NETWORK

FIELD OF THE INVENTION

The present invention is in the field of data routing over a data packet network and pertains more particularly to methods and apparatus for enhancing administrative control of data paths on a data packet network.

BACKGROUND OF THE INVENTION

Data routing on data packet networks (DPN) has continually evolved through introduction of new data routing protocols and strategies. Most routing protocols are based on shortest-path algorithms, which can be classified generally as distance-vector algorithms and link-state or topology-broadcast algorithms. In a distance-vector protocol a data router knows the length of the shortest path from each neighbor router in a network to every network destination. In a link-state protocol, each router broadcasts the state of every router's adjacent link to every other router in the network topology. The routers use the broadcast information to build a network topology, which is then used to compute shortest paths to other routers and hosts in the network. A goal of state-of-the-art routing over a data-packet-network is to maintain, as much as possible, loop-free data paths throughout the network.

Much detailed information of existing network protocols and methods for loop-free data routing is presented in a paper entitled *Loop-Free Multipath Routing Using Generalized Diffusing Computations* authored by William T. Zaumen and J. J. Garcia-Luna-Aceves. This paper is included herein as background information by reference. The referenced paper also has disclosure referenced in a U.S. Pat. No. 5,881,243 entitled "System for maintaining multiple loop free paths between source node and destination node in computer network" filed on May 7, 1997, the listed inventors being the same individuals that authored the referenced paper.

The provision of multiple paths in existing network routing protocols is somewhat limited. For example, open-shortest-path-first (OSPF) protocol enables a router to choose more than one network path to a same destination only in the event that multiple paths of a minimum cost exist and are defined. Interior-gateway-routing-protocol (IGRP) enables a router to forward data packets through network paths having lengths less than the product of shortest path multiplied by a variance factor provided by a network administrator.

More recently, diffusing algorithms have been introduced to enable more efficient loop-free routing by introducing the concept of a shortest multipath. A shortest multipath is quantified by a directed acyclic graph (DAG), which is defined by entries in routing tables (forwarding tables) of successor routers in all of the paths from a source to a destination that are guaranteed to be loop-free at any given point in time. A state-of-the-art protocol known as diffusing algorithm for shortest multipath (DASM) enables guaranteed loop-free routing.

DASM introduces a distributive approach in the synchronization of tables between routers. DASM maintains loop-freedom through the use of multiple successors for every destination at each router in the network. The only information exchanged between neighbor routers consists of vectors of shortest distances to destinations. Synchronization of tables between routers produces considerable overhead with DASM, however, the overhead can be reduced by introducing a feasibility condition to determine when any router may update its routing table without synchronizing with others. Considerable detailed notation is presented in the paper and patent referenced above, the notation explaining various aspects and conditions of DASM.

The referenced paper and U.S. Pat. No. 5,881,243 describes a system for maintaining routing tables at each router in a computer network. The system is based on (a) a feasibility condition that provides multiple loop-free paths through a computer network and that minimizes the amount of synchronization among routers necessary for the correct operation of a routing algorithm, and (b) a method that manages the set of successors during the time it synchronizes its routing-table update activity with other routers, in order to efficiently compute multiple loop-free paths, including the shortest path, through a computer network.

It is desired, in addition to loop free routing, that data traveling in a network from multiple sources to multiple destinations be managed in terms of network paths such that the network does not become un-evenly congested. The system described above utilizing DASM cannot provide efficient data flow load balancing such that one or more portions of the network are not overloaded or underutilized with respect to data carried over multiple connections having available bandwidth for data transmission, which may vary considerably due to various conditions monitorable and determinable in a given network.

Therefore, it is the goal of the present invention to provide a series of improvements to the general diffusing algorithm and concept of DASM that enable more administrative control over network-path utilization and more flexible consideration at routing points of shortest multipaths.

SUMMARY OF THE INVENTION

A control system for controlling data flow over data paths on a data-packet-network according to specific destinations known in the network is provided. The system comprises in preferred embodiments, a network monitoring system for monitoring network performance parameters; a network access system for accessing specific nodes in the network; and a control software executable on the network access system for assigning and changing cost parameters at selected nodes in the network.

A network administrator monitoring the network or portion thereof uses the network access system and control software to assign and implement cost values at the selected nodes, the values associated individually with a specific destination or destinations, the values establishing forwarding costs to be incurred at the selected nodes, and link costs to be incurred per data link between the nodes such that manipulation of such cost value assignments enables load balancing of data traveling through the network.

In one aspect of the invention, the data packet network or portion thereof controlled by the system is the Internet network. In this aspect, the network monitoring system is, preferably a computer station having network connectivity to the network or portion thereof being monitored. Also in this aspect, the network access system is preferably a computer station having connectivity to the network or portion thereof to be accessed.

In all aspects of the invention, the cost values are incorporated in a distributive algorithmic computation to compute shortest path to the associated destination. Also in all aspects, the particular node assigned the particular cost values reports those values to all neighboring nodes preceding in path to an associated destination. In a preferred aspect, the reported values are used in a distributive computation at the nodes to compute shortest path to a destination.

In another aspect of the present invention, a method is provided for altering the established course of a data path on a data-packet-network according to specific destination known in the network. The method includes the steps of (a) accessing a particular node in the course of the data path toward the destination; (b) delivering to the node at least one cost parameter specific to the destination to replace at least one existing cost parameter specific to the destination reported by the node; (c) installing the at least one new parameter replacing the at least one old parameter; and (d) reporting the at least one new parameter from the affected node to nodes neighboring the affected node such that data traffic routed to the specific destination assumes an altered route to the destination.

In one aspect, the data-packet-network under control is the Internet network. In one aspect of the method in step (a) the node is a router accessed by a computer station having connectivity to the network or portion thereof to be accessed. In this aspect, in step (a) the router is accessed as a result of need established through network monitoring.

In a preferred aspect of the method, in step (b) the at least one cost parameter is incorporated in a distributive algorithmic computation performed among the nodes to compute shortest path to the associated destination. In this aspect, in step (b) at least one cost parameter is a forwarding cost through the affected node and is set to a value of infinity.

In one aspect, in step (b) at least one cost parameter is an output link cost associated with the particular destination. In preferred application, there are more than one cost parameter one being a forwarding cost and one being an output link cost, both costs associated with a particular destination. In one aspect, in step (c) installation is performed by software remotely.

In one aspect of the method in step (d) reporting the at least one cost parameter to the neighboring nodes causes a complete bypass computation of the affected node particular to data routed to the stated destination. In another aspect of the method in step (d) reporting the at least one cost parameter to the neighboring nodes causes a maximal utilization of the affected node particular to data routed to the stated destination. In still another aspect in step (d) reporting the at least one cost parameter to the neighboring nodes causes a partial utilization of the affected node particular to data routed to the stated destination.

Referring now back to the control system, in one embodiment, the assignment and implementation of cost values at routing nodes is pre-configured by the network administrator including provision and implementation of a table or tables containing optional forwarding costs per destination and at least one threshold value applicable to the physical link conditions as may be detected by the node wherein detection by the node of an occurrence of the at least one threshold value on any of the physical links triggers and automated reassignment of an appropriate forwarding cost per selected destination using the affected link from the table of optional forwarding costs. In one variation of this embodiment, the threshold value equates to general traffic load conditions over a physical link.

In a preferred aspect of this embodiment, the reassigned forwarding costs triggered by occurrence of the threshold are computed along with other costs and advertised to neighbors pertinent to data flows containing a destination label or labels responsible for the preponderance of the load.

In one aspect, the data-packet-network under control of the system is internal to a data router and the nodes are computerized network cards connected together to form the internal network of the node.

In still another aspect of the present invention, a method is provided for automatic alteration of an established course of a data path on a data-packet-network according to specific destination known in the network. The method includes the steps of (a) providing and implementing at a selected node in the data path a the table or tables containing optional forwarding costs per destination and at least one threshold value applicable to physical link conditions as they may detected by the node during operation; (b) detecting at the selected node an occurrence of the at least one threshold value over one or more of the physical links; (c) reassigning a forwarding cost or costs per destination or destinations as an automatic result of detection in step (b); (d) computing the reassigned forwarding costs along with other costs of the affected links; and (e) advertising the resulting cost values per destination to neighboring nodes utilizing the affected link or links.

In one application of the method, the data-packet-network is the Internet network. In one aspect of this application, in step (a) the threshold value represents a general traffic load condition over a physical link. In a preferred aspect of the method steps (b)–(e) are wholly automated and performed within the selected node. In one aspect of the method, the data-packet-network is internal to a data router and the nodes are computerized network cards connected together to form the internal network of the router.

Now, for the first time, a control system is provided to enable load balancing of data flowing through a data-packet-network practicing a distributive routing protocol characterized by enhanced administrative control over network-path utilization and more flexible consideration at routing points of shortest multi-paths.

DESCRIPTION OF THE PREFERRED EMBODIMENTS

Efficient load-balancing capability is not currently available in any prior-art network routing protocols including state-of-art loop-free protocols. The inventor herein provides a method, that when used with diffusing computations to determine shortest multiple paths from a source node to a destination node, also provides effective and efficient load-balancing capability to network administrative personnel.

Figure 1:
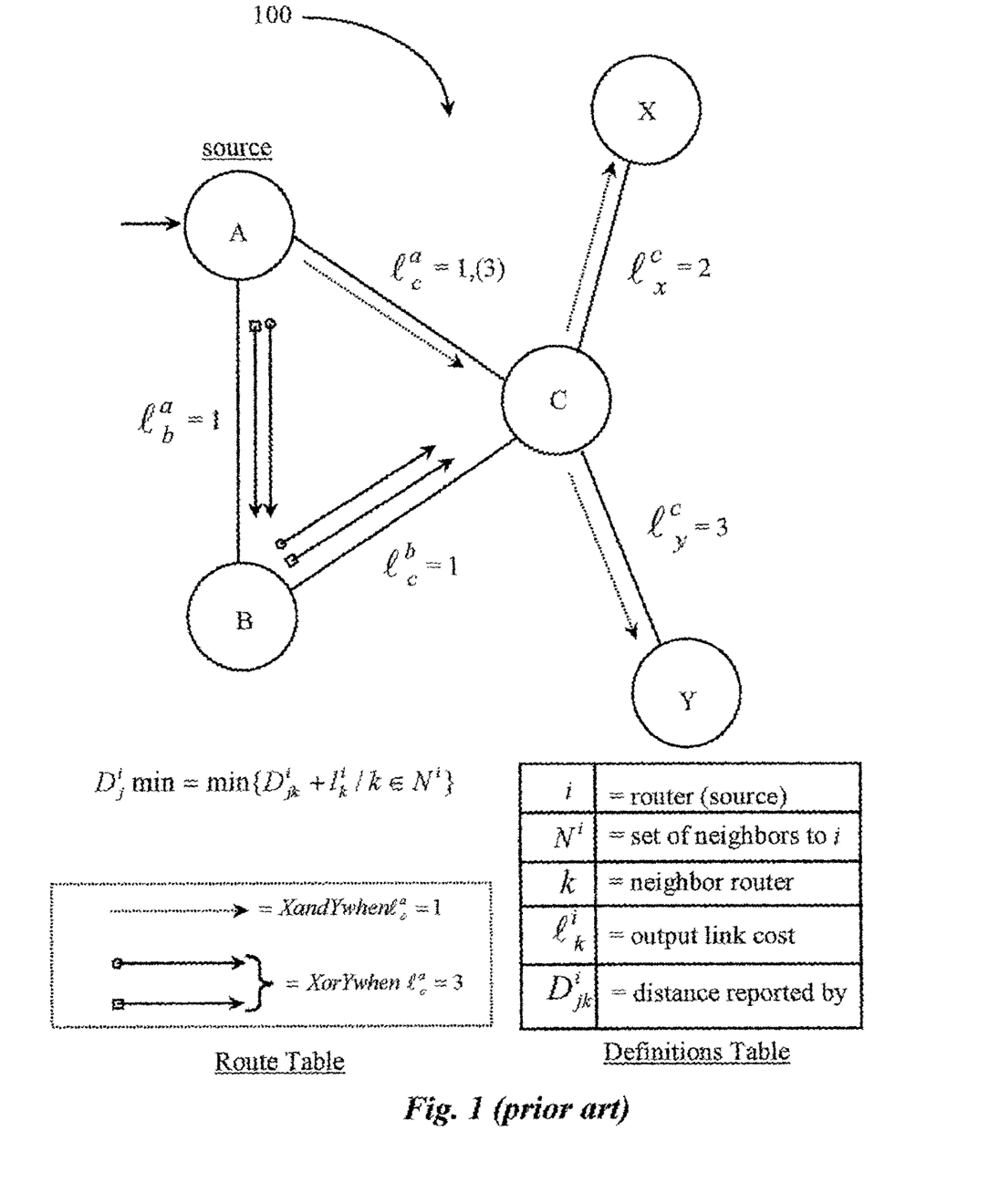
FIG. 1 is a block diagram illustrating a typical route computation sequence affecting data routes according to prior art.

FIG. 1 is a block-diagram illustrating a data network 100 practicing a typical DASM computation sequence effecting data routes according to prior art. Network 100 is greatly simplified in this example for the purpose of ease of explanation of the prior art and the present invention. Network 100 comprises a source node or router A, two neighbor routers to A (routers B and C), and two destination nodes or routers connected to neighbor router C, these being X and Y.

Router A is designated as a source router in this example for purpose of discussion only. Similarly, routers X and Y are designated destination routers for exemplary purpose only. Router C is situated within network 100 in this example as a must-go-through router to reach destination routers X or Y from source router A.

Illustrated immediately below network 100 is a notation describing a general prior-art diffusion algorithm for determining shortest paths according to DASM protocol explained in the references listed in the background section of this specification. A definitions table (labeled as such) is illustrated at lower right of network 100. The definitions table provides definitions for variables used in the prior-art notation illustrated in this example.

In the table, i represents a router considered in this example to be a source or beginning point. Router A is analogous to i in this example. $N^i$ represents a set of neighbor routers connected directly to i by network link. Routers B and C of this example comprise this set of neighbors. One router of this set represent a neighbor router or k. The prior art notation includes an assigned output link cost expressed as $\ell_k^i$. This is a cost of an output link from a given router to a given neighbor of that router. Assigned output-link costs are illustrated, in this example, on each network link of network 100. $D_{jk}^i$ represents a distance (cost or length) from source i to destination j as reported by neighbor k to i.

A route table is illustrated in this example below and left of network 100. The route table provides the graphic identification of arrows used in the illustrated example of network 100.

When data arrives at router A that is destined for router X, router A computes shortest paths to X from A. Neighbor B reports to A that it can reach router X with a cost of 3. This is a summation of the output-link costs along the route from B to X as reported to A. The output-link cost $\ell_b^a=1$. Therefore, it will cost 4 to reach X from A through B and then C. The output-link cost from A to C ($\ell_c^a$)=1 initially. The output-link cost from C to X ($\ell_x^c$)=2. C reports to A that it can reach X with a cost of 2. Therefore, it will cost 3 to route data from A to X through C only, representing the shortest path. Router A consults a forwarding table for the information. Similarly, the shortest path to Y from A is also through C with B not being included in the route. For example, B reports to A that it can reach Y with a cost of 4, and the output-link cost from A to B is 1, resulting in a total cost of 5. The dotted arrows represent all data for X and Y being routed through C excluding B because of computed shortest path. Router B, in this example is not a successor router. In prior art, the output-link costs must be changed to effect alternate routes. In this example, $\ell_c^a$ is only specific to a cost over the link between A and C for all network destinations. In this example, the cost is changed from 1 to 3. Looking at the route table illustrated below and left of network 100, the solid arrows with tail symbols represent all data to X and Y from A when the output-link cost from A to C has been changed to 3. Router sequence A, B, and C represents the shortest path to both destinations as a result of the cost change on link A/C.

A problem with this technique is that it is arbitrary for all network destinations and not specific to any one destination. Other paths to other destinations (not shown) may also be forced to change as a result of the cost change having unforeseen consequences in the balancing of data traveling through the network.

Figure 2:
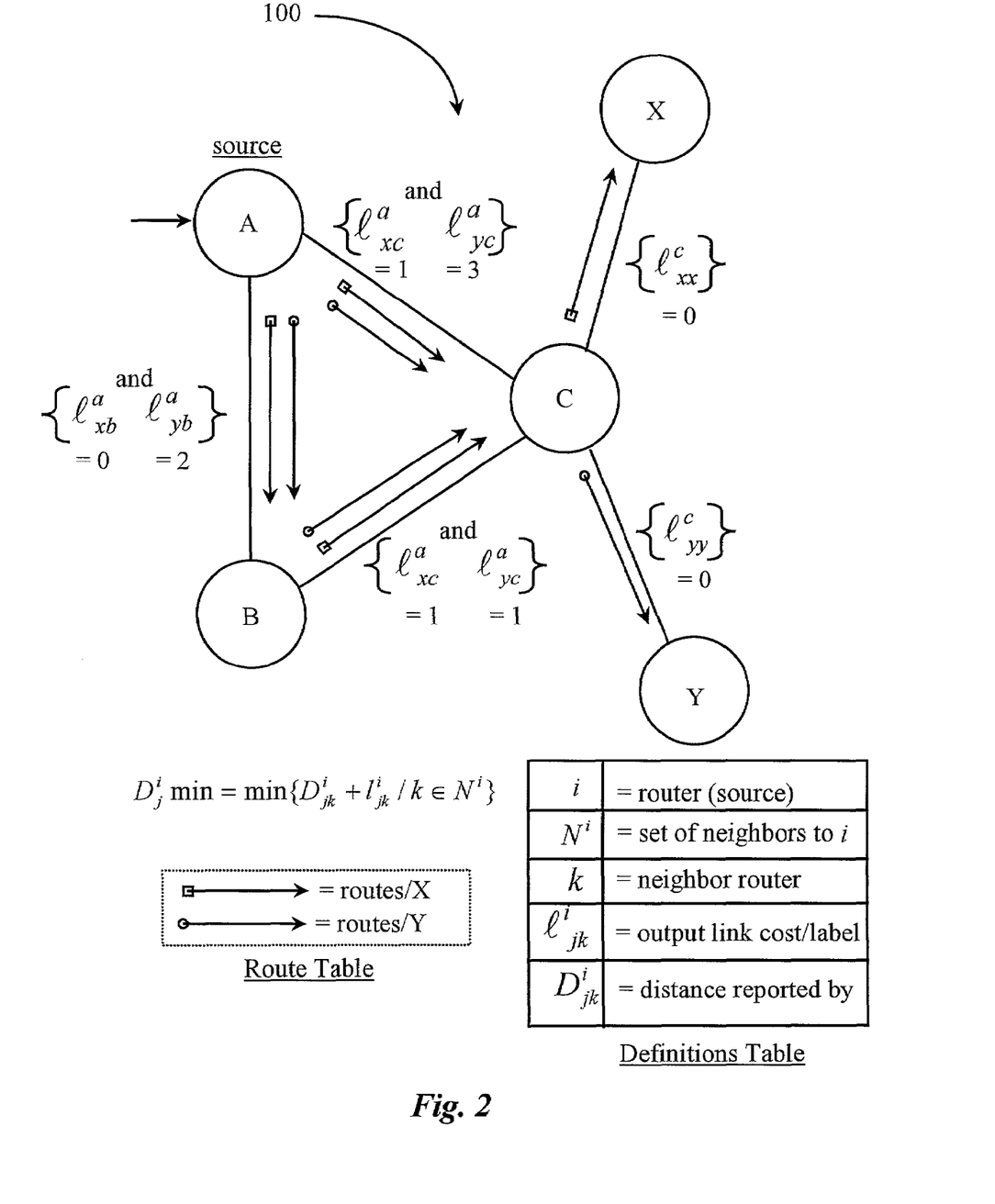
FIG. 2 is a block diagram illustrating a route computation sequence using cost per DAG label affecting data route determination according to an embodiment of the present invention.

FIG. 2 is a block-diagram illustrating network 100 of FIG. 1 practicing a computation sequence affecting data routes according to an embodiment of the present invention. Network 100 comprising connected routers A, B, C, X and Y is identical in construction to the network of FIG. 1. Router A is considered a source in this example, as in FIG. 1, and destinations (X, Y) are unchanged. In this example, output-link costs are enhanced with a variable designating a specific destination. This concept introduces a destination as a reportable label that can be tabled and reported by any given node in the network. Such a destination can be any network recognized address specific to a single node, or a single grouping of nodes such as a LAN address.

Therefore, in this example $\ell_k^i$ as expressed in the notation of FIG. 1 above is modified according to a goal of the present invention to express an output-link cost that can be made specific to a single destination j. Using the prior-art notation variables the new variable is expressed as $\ell_{jk}^i$ denoting a single output link cost per DAG label j. It is noted herein that there may be as many cost assignments as there are tabled destinations in a given network. For that matter, the label destinations may also be those of a connected network not practicing DASM.

A definitions table illustrated below and to the right of network 100 illustrates the new variable. The notation illustrated just below network 100 incorporates this new variable instead of the former variable described with reference to FIG. 1. The concept of assigning costs per DAG label allows network administrators to better control manipulation of active data paths at router points.

Now there are illustrated 2 output link costs assigned from A to C per DAG labels X and Y, 2 output-link costs assigned from A to B per DAG labels X and Y, and 2 output-link costs assigned from B to C per DAG labels X and Y. It is noted herein that there may be as many separate cost values assigned to output links as there are destination labels in a DAG. It is also important to note that a DAG is viewed from the perspective of a computing node or router in the network. In this case that router is router A exemplified herein as a source router or node. A route table illustrated below and left of network 100 in this example provides definitions for the two separate arrows used in this example to show data routes computed by A to destinations X and Y.

In this example, $\ell_{xc}^a=1$ and $\ell_{yc}^a=3$, meaning that the cost from A to C for X is 1 and the cost from A to C for Y is 3. Also, from A to B there is $\ell_{xb}^a=0$ and $\ell_{yb}^a=2$. These costs are configurable from the point of router A in network 100. It is noted herein that the use of variable 0 as an assigned output link cost is exemplary only and chosen for illustration specifically to simplify addition in this example. In actual practice of the invention, an output link cost value must be greater than 0.

By assigning the specific output-link costs illustrated in this example, shortest paths from A to destination labels X and Y are equally balanced through neighbor routers B and C. For example, the cost from A to X through C only is 0+1 or 1. The cost from A to X through B and C is 0+1+0 or 1. Therefore, data coming through A and destined for X may be split along two separate paths equally. In this embodiment, one communications flow for X may be routed through C only, while a separate communications flow for X may be routed through B and C simultaneously.

The parameters for data destined for label Y from router A are similarly balanced such that there are 2 shortest paths each costing 3 from A. By changing costs for a specific label at the output of router A an administrator may cause all data for Y to travel through C only. For example, by changing $\ell^a_{yb}$ from 2 to 3, all data from router A to router Y will travel through router C excluding router B. By providing multiple output-link costs dedicated singularly per DAG label, a much finer control capability for defining and selecting shortest paths is available to administrators. Multiply the example to include many more routers and destination labels, and one with skill in the art will appreciate the new capability. In addition to the above, the inventor provides a new cost per router in a network that is termed an input-link cost or forwarding cost by the inventor. The new parameter is discussed in detail below.

Figure 3:
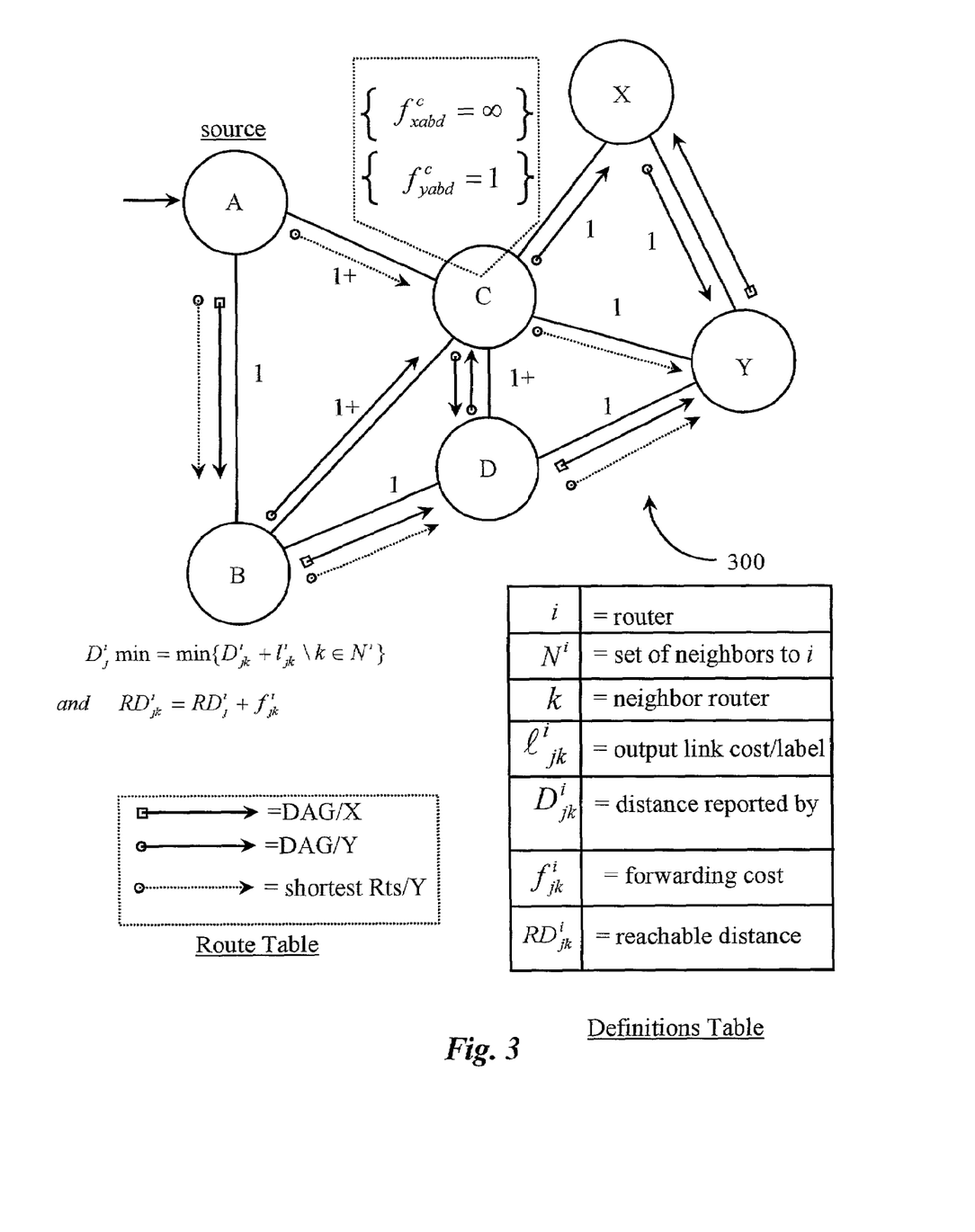
FIG. 3 is a block diagram illustrating a network practicing route manipulation per DAG label configurable at the point of any single router according to an embodiment of the present invention.

FIG. 3 is a block diagram illustrating a network 300 practicing route manipulation per label configurable at the point of a single router according to an embodiment of the present invention. Network 300 comprises connected routers A, B, C, D, X and Y. In this example, a router D and connections are added to the exemplary network 100 of FIGS. 1 and 2. Addition of router D provides for a more flexible network for the purpose of explaining the input-cost-per-router parameter of the present invention.

A definitions table illustrated below network 300 and to the right has variables illustrated therein that were not described with reference to FIG. 2 above. One of these variables is expressed using the prior-art notation as $f_{jk}^i$, meaning a cost to forward through a router advertised to a neighbor router per DAG label j. Termed an input link cost or simply a forwarding cost, this cost is assignable and configurable to any router or node in a given network to be reported to any neighbor k per destinations. The other variable is a modified expression of a prior art value expressed in disclosure of the reference entitled "Loop-Free Multipath Routing Using Generalized Diffusing Computations", and mentioned in reference U.S. Pat. No. 5,881,243 as $RD_j^i$, which was described in the prior-art references a cost for destination j used in messages sent to neighbors k. The modified variable listed as the bottom entry in the table is equivalent to the sum of the first described variables and is expressed according to one embodiment of the invention as $RD_{jk}^i$. The equation summing the variables is expressed immediately under the equation for $D_j^i$ min. which is unchanged from that referenced in the example of FIG. 2 above.

In the notation illustrated just below network 300, the added equation is included for determining shortest path dependent on assigned input costs, which may vary as reported to a subset of neighbors described as up-line neighbors that would seek to use a particular reporting router through which to forward data to a particular destination. A Route Table is illustrated just below network 300 and to the left. The route table provides definitions for arrows used in the network example to depict data routes to specific destination labels.

In this example, a network administrator (not shown) has configured router C for the purpose of halting forwarding of data through C from neighbor routers preceding (up-line from) router C in succession for a specific destination X. In this example, cost values are given a 1 for all links for simplification of explanation. At router C, an input-link cost (forwarding cost)=infinity for neighbor routers A, B, and D for DAG label X. Up-line and immediate neighbors of C have a + sign associated with their assigned output costs indicating that router C, in this case, has added the value ∞ to current output cost values reported to neighbors A, B, and D. Similarly, router C has a forwarding cost for destination Y. At router C the cost=1 to forward through C from routers A, B, and D for DAG label Y. In this example, the former open paths to X through C for data traveling to X are now closed as no data to X can travel through C from any neighboring up-line router. However, data traveling to label Y is not so restricted.

Configuration of router C in this example does not preclude configuring input costs for any other routers in network 300. Router C is illustrated as the point of configuration in this example for purpose of discussion only. All k routers up line from C have a + sign indicated next to their original output costs indicating the added forwarding costs, which are added by router C to any other costs per DAG label (X,Y) and reported as a single value. The actual forwarding cost values are transparent to the receiving routers (A,B, and D). All other costs=1 for sake of simplicity only in presenting this example. It is noted herein that forwarding costs are added to other costs, and then reported up line in reverse succession to a specified destination. For example, each router capable of reaching a destination reports cost+any assigned forwarding costs to neighbor routers that can also reach the destination through it. In this example, the data path direction is illustrated from source A for simplicity only.

By setting $f_{xabd}^c = \infty$ at router C, routers A, B, and D are prevented from considering router C as a successor to reach X and will find alternate paths. Therefore, the only available path from A to X in this example is A, B, D, Y and then X. There are many possible reasons for such configuration performed at router C including a very large amount of traffic going to X wherein C may become taxed in forwarding requirements. Another reason may be that the route along A, B, D, and Y has more bandwidth capability and the X traffic is largely VoIP data requiring more bandwidth.

Router C has also been assigned a forwarding cost of 1 for DAG label Y for neighbor routers A, B and D. The effect of this assignment is to balance Y traffic through 2 shortest paths, but not to prevent routers A, B, and D from forwarding data through C to Y. For example, from A to Y through C costs 1+1+1 or 3. Similarly, from A to Y following the path A, B, D, and then Y also costs 3. Using C as a successor from B wherein A is a source costs 4. Using C as a successor from D wherein A is the source costs 5. Using D as a successor from C wherein A is the source costs 4. Costs of 5 and 4 are incurred respectively for paths A, B, C, X, and then Y; and A, C, X, and then Y wherein A is the source. A cost of 6 is incurred for possible Y path of A, B, D, C, X, and then Y. Therefore, the computed shortest paths from the viewpoint of A are shown as dotted arrows as illustrated in the route table. Since the path from A to X is routed around C, the most logical shortest path for Y from A is directly through C.

The capability of configuring any given router in a network with a forwarding cost per DAG label enables efficient load-balancing over any portion of the network. A costly alternative to simply configuring a single router would be to change the output-link costs for every link from C to its neighboring routers. It will be apparent to one with skill in the art, after considering the teaching of this disclosure, that the method of applying an input-link cost or forwarding cost at a single router is much more efficient and cost effective. Moreover, assigning the forwarding costs per DAG label enables a much finer control over data paths to a specific destination in a given network.

When assigning a forwarding cost to a router, it is not required that it be the same value reported to all neighbor routers. For example, it may be desired that routers A and B cannot forward data through C for X while router D can but at a greater cost than other shorter routes. There are many possibilities. Using the described load-balancing techniques into a computation for determining shortest multipaths is not strictly limited to DASM in order to practice the present invention. Other distributive algorithmic protocols may also be modified to accept and utilize the load-balancing methods of the invention. For example, forwarding costs may be implemented at routers bordering two separate networks operating different routing protocols in order to control where data from the first network for specific destinations in the second network enters that network. There are many possibilities.

Tools of administration that are known in the art may be utilized to administer the variable (cost) changes that may be desired upon determining network performance parameters. For example, an administrator in charge of a portion of a network will have a monitoring station and an implementation station, preferably powerful computer stations. The mechanism of cost change and configuration can be software of any known machine-readable language having compatibility and interoperability with the language of the protocol used in the given network portion. In this way, an administrator may remotely configure specific routing points for specific destinations in order to manipulate active and future data paths through the affected routes.

In one embodiment of the present invention, assignment of specific forwarding costs to be used in computation and distance reporting from any particular router is an automated function triggered by a detected network condition such as load verses capacity over an incoming or outgoing link of the router. In this case, an administrator configures a threshold value (per link) for a router, or a number of values applicable to a number of routers under the administrators charge. A table of optional forwarding costs is also generated and provided to each router. According to the threshold trigger, a configured router reassigns it's link input or forwarding costs pertinent to the affected link and computes the cost in messages sent to a particular up-line neighbor or neighbors. A series of triggers may be employed to cause automated reassignment, computation and reporting using an appropriate forwarding cost from the table the values reported to specified up-line neighbors. In this way, a router can manage network changes affecting it without administrative interference.

It will be apparent to one with skill in the art that the components $\ell_{jk}^{i}$ described as an output-link cost per label j, and $f_{jk}^{i}$ described as an input-link cost (forwarding) may be applied in combination or separately to distributive routing protocols to enhance load-balancing control without departing from the spirit and scope of the present invention. The basic method of practicing the invention involves monitoring prevailing network conditions and re-assigning costs using the provided components appropriately at accessible routing points in the network in order to actively manipulate data routes. Similarly, substantial modeling can be done through simulation techniques for accurate pre-configure parameters needed to setup optimally balanced networks subject to predictive traffic conditions. There are many possible applications.

In one embodiment of the present invention, the load-balancing technique and apparatus taught herein is applicable to data packet networks that are internal to routers. In this embodiment, routers utilizing internal routing fabric comprising a plurality of fabric cards can be configured to utilize DASM or other shortest path protocols wherein the methods of the present invention are used to optimally load-balance traffic traveling through the internal routing fabric. In this case, the nodes are the individual fabric cards making up the network or fabric of the router. The destination label j in this case is egress port identifications per DAG label.

It is noted herein that internal routing fabric in a data router as known to the inventor includes line cards that function as interfaces between internal fabric and the external network, and control cards, which function as internal control communication facilitators. In a preferred case of internal fabric load-balancing, all cards are adapted to run DASM or other applicable shortest-path routing protocols. A slight modification exists in that to avoid attempts by fabric cards to consider a line card or a control card of the host router as an applicant to forward data packets through toward a destination label, it is required that forwarding costs assigned to both control cards and line cards be set to $\infty$ and reported to all neighboring fabric cards. This prevents any fabric card from attempting to utilize a line card or a control card as a forwarding successor to a destination port.

It is known the control cards and line cards existing in a state of plurality in a router must communicate with each other through the internal fabric of the router and in some instances through each other without requiring fabric utilization. While fabric cards should not be enabled to utilize line or control cards to forward data packets, line and control cards should, for the most part, be enabled to forward data (packets, and control data) through other like cards and through fabric cards. Therefore advertisements received at line and control cards from both fabric and other line and control cards should be an appropriate value as a cost to forward data through neighboring line or control cards and through fabric cards that is other than $\infty$. The reason that the value advertised is not strictly 0 is that it still may be desired to control which of a plurality of fabric cards a line card will use as a first hop through a router. Moreover, a path may be identified from one line card, for example, as a source to a control card as a destination that does not have to include a fabric card in the path but does include one or more line or control cards in the path.

In a case where line and control cards communicate directly with one another without using fabric cards in the paths then it may be that a separate and dedicated network is provided for such same-side communication wherein communication may be conducted there between any number of same-side cards without having another card fabric or otherwise in the communication paths. In this case, line and control cards of a same side of fabric do not advertise to one another.

Because of the same nature shared between an external data packet network comprising connected nodes and an internal data packet network comprising connected cards within a router, the method and apparatus of the invention can be adapted to both environments. The present invention should then be afforded the broadest possible scope under examination. The spirit and scope of the present invention is limited only by the claims that follow.

What is claimed is:

1. A control system for controlling data flow over data paths on a data-packet-network comprising:

a network monitoring system for monitoring network performance parameters;

a network access system for accessing specific nodes in the network; and a control software executable on the network access system for assigning and changing forwarding cost values for selected paths between neighboring nodes in the network;

characterized in that a network administrator monitoring the network or portion thereof uses the network access system and control software to assign two or more cost values for a singe path between network nodes, each cost value independent of the others assigned on a particular path, and each associated with a specific destination, enabling load balancing of data traveling through the network.

2. The control system of claim 1 wherein the data-packet-network is the Internet network.

3. The control system of claim 1 wherein the network monitoring system is a computer station having network connectivity to the network or portion thereof being monitored.

4. The control system of claim 1 wherein the network access system is a computer station having connectivity to the network or portion thereof to be accessed.

5. The control system of claim 1 wherein the cost values are incorporated in a distributive algorithmic computation to compute shortest path to the associated destination.

6. The control system of claim 5 wherein the particular node assigned the particular cost values reports those values to all neighboring nodes up-line from the particular node.

7. The control system of claim 6 wherein the reported values are used in a distributive computation at the nodes to compute shortest path to a destination.

8. A method for altering the established course of data paths in a data-packet-network according to specific destinations known in the network, comprising steps of:

(a) accessing a particular node in the network;

(b) creating at the node two or more different cost values each specific to a destination in the network for a path to a neighboring node; and (c) reporting the cost values from the particular node to nodes neighboring the nodes such that data traffic routed to the specific destination assumes an altered route to the destination.

9. The method of claim 8 wherein the data-packet-network is the Internet network.

10. The method of claim 8 wherein in step (a) the node is a router accessed by a computer station having connectivity to the network or portion thereof to be accessed.

11. The method of claim 10 wherein in step (a) the router is accessed as a result of need established through network monitoring.

12. The method of claim 8 wherein in step (b) the cost values are incorporated in a distributive algorithmic computation performed among the nodes to compute shortest path to the associated destination.

13. The method of claim 8 wherein in step (b) at least one cost value is a forwarding cost through the affected node and is set to a value of infinity.

14. The method of claim 8 wherein in step (b) at least one cost value is an output link cost associated wit the particular destination.

15. The method of claim 8 wherein there are more than one cost values, one being a forwarding cost and one being an output link cost, both costs associated with a particular destination.

16. The method of claim 8 wherein in step (c) installation is performed by software remotely.

17. The method of claim 8 wherein in step (c) reporting cost values to the neighboring nodes causes a complete bypass computation of the affected node particular to data routed to the stated destination.

18. The method of claim 8 wherein in step (c) reporting the cost values to the neighboring nodes causes a maximal utilization of the affected node particular to data routed to the stated destination.

19. The method of claim 8 wherein in step (c) reporting the cost values to the neighboring nodes causes a partial utilization of the affected node particular to data routed to the stated destination.

20. The control system of claim 1 wherein the assignment and implementation of cost values at routing nodes is pre-configured by the network administrator including provision and implementation of a table or tables containing optional forwarding costs per destination and at least one threshold value applicable to the physical link conditions as may be detected by the node wherein detection by the node of an occurrence of the at least one threshold value on any of the physical links triggers an automated reassignment of an appropriate forwarding cost per selected destination using the affected link from the table of optional forwarding costs.

21. The control system of claim 20 wherein the threshold value equates to general traffic load conditions over a physical link.

22. The control system of claim 21 wherein the reassigned forwarding costs triggered by occurrence of the threshold are computed along with other costs and advertised to neighbors pertinent to data flows containing a destination label or labels responsible for the preponderance of the load.

23. The control system of claim 1 wherein the data-packet-network is internal to a data router and the nodes are computerized network cards connected together to form the internal network of the node.

24. A method for automatic alteration of an established course of a data path on a data-packet-network according to specific destination known in the network comprising steps of:

(a) creating at a selected node in the data path a table containing optional forwarding costs per destination and at least one threshold value applicable to physical link conditions as they may detected by the node during operation;

(b) detecting at the selected node an occurrence of the at least one threshold value over one or more of the physical links;

(c) reassigning a forwarding cost or costs per destination or destinations as an automatic result of detection in step (b);

(d) computing the reassigned forwarding costs along with other costs of the affected links; and (e) advertising the resulting cost values per destination to neighboring nodes utilizing the affected link or links.

25. The method of claim 24 wherein the data-packet-network is the Internet network.

26. The method of claim 24 wherein in step (a) the threshold value represents a general traffic load condition over a physical link.

27. The method of claim 24 wherein steps (b)–(e) are wholly automated and performed within the selected node.

28. The method of claim 24 wherein the data-packet-network is internal to a data router and the nodes are computerized network cards connected together to form the internal network of the router.

* * * * *